(12) United States Patent
Howarth et al.

(10) Patent No.: US 6,523,072 B1
(45) Date of Patent: Feb. 18, 2003

(54) SYSTEM AND METHOD OF TRANSMITTING KEYSTROKE INFORMATION TO A CLIENT TERMINAL

(75) Inventors: Mark E. Howarth, Orem, UT (US); David A. Jensen, American Fork, UT (US)

(73) Assignee: Landesk Holdings, Inc., Salt Lake City, UT (US)

( * ) Notice: Subject to any disclaimer, the term of this patent is extended or adjusted under 35 U.S.C. 154(b) by 0 days.

(21) Appl. No.: 09/471,544

(22) Filed: Dec. 23, 1999

(51) Int. Cl.[7] .......................... G06F 13/00; G06F 13/22
(52) U.S. Cl. ............................. 710/33; 710/65; 710/67; 709/203; 709/208; 709/217
(58) Field of Search .............................. 710/33, 65, 67; 709/203, 208, 217

(56) References Cited

U.S. PATENT DOCUMENTS

| 5,712,978 | A | * | 1/1998 | Lerner et al. ................ 709/224 |
| 5,812,864 | A | * | 9/1998 | McCoy et al. ................. 703/26 |
| 6,081,629 | A | * | 6/2000 | Browning, Denton R. ... 358/473 |
| 6,106,564 | A | * | 8/2000 | Chen, Chen Sheng ........ 703/21 |
| 6,243,738 | B1 | * | 6/2001 | Hayles et al. ................ 370/312 |

* cited by examiner

Primary Examiner—Jeffrey Gaffin
Assistant Examiner—Rehana Perveen
(74) Attorney, Agent, or Firm—Kenta Suzue; Wilson Sonsini Goodrich & Rosati

(57) ABSTRACT

Disclosed herein are a system and method for using a remote terminal to control processes executing on a client terminal by transmitting data to the client terminal emulating keystroke inputs at the client terminal. A remote control application program executing at the remote terminal initiates the transmission of a message for emulating keystroke inputs to the client terminal. The remote terminal also executes an operating system having logic for responding to a detection of any one combination of keystrokes of a set of predetermined combinations of keystrokes, independently of any application program executing on the remote terminal. While the remote control application is active, the remote terminal inhibits the operating system from responding to detected keystrokes and transmits a message to the client terminal emulating an input of the detected keystrokes at the client terminal.

20 Claims, 3 Drawing Sheets

SYSTEM AND METHOD OF TRANSMITTING KEYSTROKE INFORMATION TO A CLIENT TERMINAL

BACKGROUND

1. Field of the Invention

Embodiments described herein related to computer networks. In particular, embodiments described herein relate to systems and methods for remotely transmitting inputs to processes executing on a computer through a network.

2. Related Art

Computer networks such as a local area network (LAN) or wide area network (WAN) are used to facilitate communication among computer workstations. Often times there is a need for a user to communicate with applications programs executing at a first terminal through a second terminal on the network. For example, a systems operator at a remote terminal may provide inputs to processes executing at a client terminal using systems such as Intel's LANDesk Management Suite, Hewlett Packard's HP Openview System and Microsoft's System Management Server. These systems typically enable a systems operator to, from a remote terminal, view what is displayed on a client terminal in response to an application executing on the client terminal, as well as provide device inputs to the application on the client terminal through peripheral devices at the remote terminal. In multi-tasking environments such as Windows '95 or Windows NT 4.0, the systems operator may switch the input and display focus between local applications programs executing at the remote terminal and applications programs executing at the client terminal.

When a process executing at the client terminal has the input and display focus of the remote terminal, an application program executing at the remote terminal initiates the transmission of data through the network to the client terminal to emulate peripheral device inputs at the client terminal. In a Win 32 environment, this application program at the remote terminal may initiate transmission of signals to the client terminal in response to device driver messages at the remote terminal through an applications programming interface (API). While focused on receiving display signals from, and transmitting messages to, processes at the client terminal, the remote terminal will typically transmit messages to the client terminal to emulate almost all keystroke inputs entered at the remote terminal. However, certain combinations of keystrokes, such as "ctrl+alt+del," "alt+tab" and "ctrl+esc" are intercepted at the operating system of the remote terminal so that the operating system responds to these keystroke commands locally. Accordingly, regardless of whether the remote terminal is focused on providing inputs to processes executing at the client terminal, the application program executing at the remote terminal will not respond to these combinations of keystrokes by transmitting messages to the client terminal to emulate these keystroke inputs at the client terminal.

To overcome the inability to provide keystroke inputs from the remote terminal, the application program executing at the remote terminal typically provides a feature such as a toolbar button or menu item allowing the systems operator at the remote terminal to initiate the transmission of a message to the client terminal emulating the desired keystroke combination which would otherwise be intercepted at the operating system. There is a need for a more convenient, less awkward, method for transmitting signals to the processes executing at the client terminal to emulate device inputs to these processes.

SUMMARY

An embodiment of the present invention is directed to a system and method of transmitting messages from a remote terminal to a client terminal to emulate keystroke inputs to processes executing at the client terminal. The remote terminal executes an operating system having an operating system kernel for responding to detections of keystroke combinations independently of any application program executing on the remote terminal. The remote terminal has logic that detects whether combinations received at the remote terminal are one of the predetermined keystroke combinations and inhibits the operating system from responding to the detected keystroke combinations independently of any application program executing on the remote terminal.

DETAILED DESCRIPTION

Embodiments of the present invention are directed to a system and method of transmitting data from a remote terminal to emulate keystroke inputs to processes executing on a client terminal through a computer network connecting the remote and client terminals. The operating system of the remote terminal responds to certain combinations of keystroke inputs at the remote terminal independently of application programs executing on the remote terminal. While a remote control application of the remote terminal provides keystroke inputs to processes executing at the client terminal, the remote terminal may invoke logic inhibiting its operating system kernel from responding to keystroke inputs independently of an application program. Instead, the remote control application executing at the remote terminal initiates the transmission of a message to the client terminal to emulate keystroke inputs at the client terminal corresponding with detected keystroke inputs.

Figure 1:
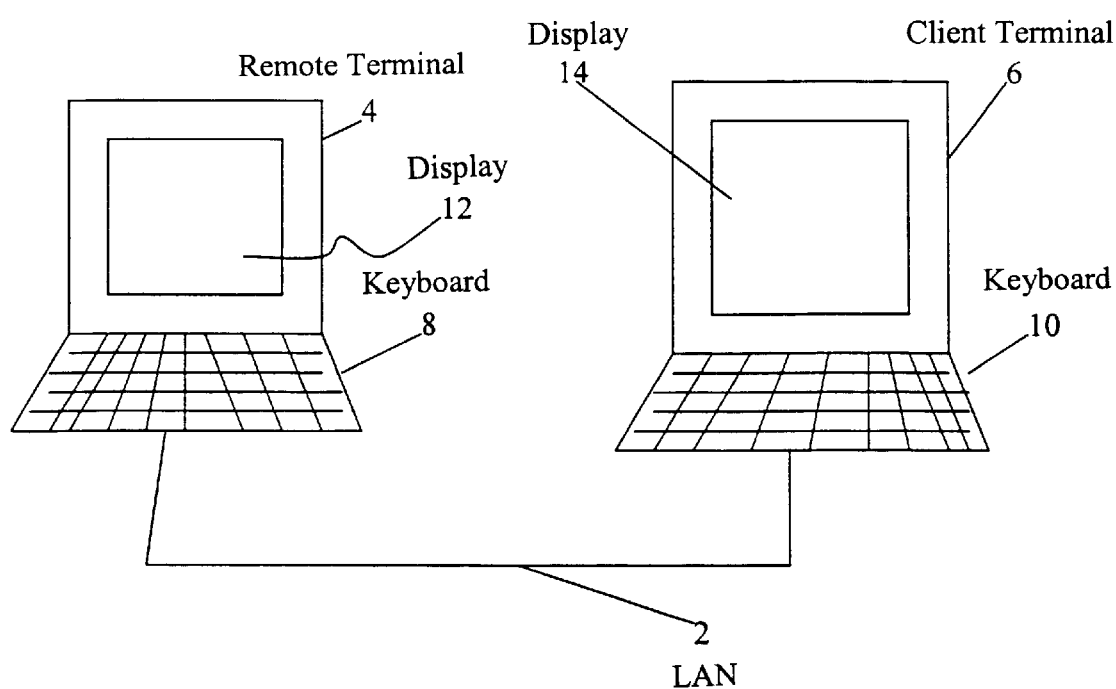
FIG. 1 shows a local area network coupling a remote terminal and a client terminal according to an embodiment.

FIG. 1 shows a remote terminal 4 and a client terminal 6 coupled in a LAN 2. In other embodiments, the remote terminal and client terminal may be coupled through a WAN, the Internet or any other network having a protocol for transmitting packetized data. The remote terminal 4 includes a keyboard 8 and a display 12, in addition to a processor (not shown) for executing computer instructions. The client terminal 6 similarly includes a keyboard 10, a display 14 and a processor (not shown) for executing computer instructions. According to an embodiment, the processors of the remote terminal 4 and the client terminal 6 each include a central processing unit (CPU) and random access memory (RAM) which is sufficient to support a Windows '95 or Windows NT 4.0 operating system and applications programs compatible with these operating systems. According to an embodiment, a user may interact with processes at the client terminal 6 through the keyboard 8 and display 12 of the remote terminal 4. The operating system on the remote terminal 4 responds to certain keystroke inputs at the keyboard 8 independently of applications programs executing on the remote terminal 4. For example, combinations of keystrokes such as "ctrl+alt+del," "alt+tab," and "ctrl+esc" will cause an operating system kernel of a Windows '95 or Windows NT 4.0 operating system to respond by displaying an image on the display 12 without any input signals from an application program to provide such displays. In one embodiment, the processor of the remote terminal 4 includes logic for inhibiting an operating system kernel from responding to keystrokes and transmitting messages from the remote terminal to the client terminal 6 to emulate these keystrokes as inputs to processes executing at the client terminal 6.

Figure 2:
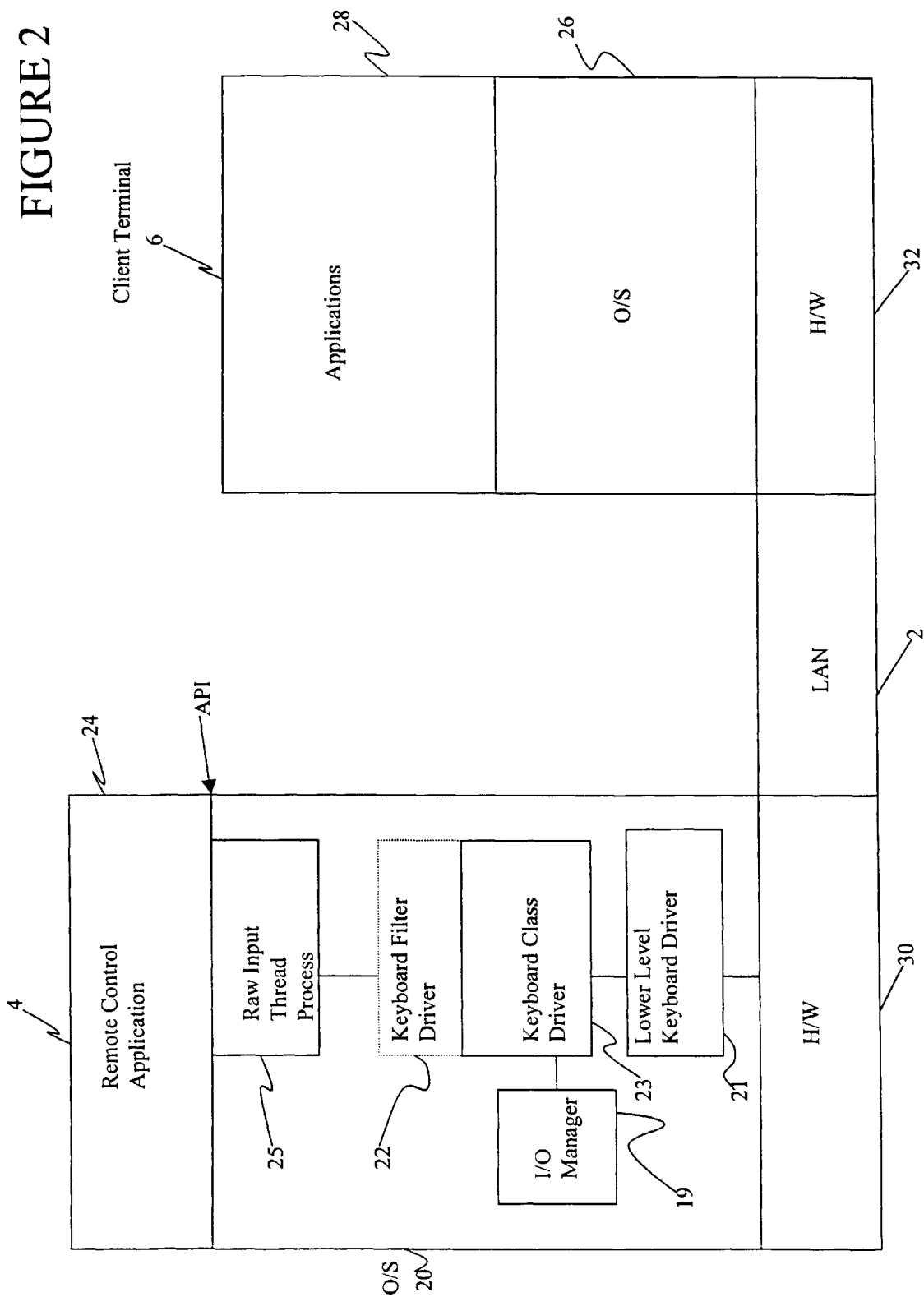
FIG. 2 illustrates the relationship between embodiments of the software stacks executing at the remote and client terminals according to the embodiment of FIG. 1.

FIG. 2 shows a diagram illustrating the relationship between processes executing on a software stack on the remote terminal 4 and the client terminal 6. In particular, an operating system 20 controls hardware 30 of the remote terminal 4 and an operating system 26 controls hardware 32 of the client terminal 6. The operating systems 20 and 26 support applications programs via an application program interface (API) known to those of ordinary skill in the art. The operating system 20 preferably includes an input/output (I/O) manager 19 for controlling the processing of I/O request packets (IRP) and an operating system kernel for transmitting IRPs to the API. The I/O manager controls the creation of IRPs from keyboard drivers 21 and 23 in response to events occurring at peripheral devices such as keystrokes at the keyboard 8. In the presently illustrated embodiment, the operating system 20 includes a lower level keyboard device driver 21, responding directly to hardware interrupts caused by keystrokes detected at the keyboard 8, and a keyboard class driver 23 which handles IRPs initiated at the lower level keyboard driver 21. The operating system 20 may transmit data packets to the operating system 26 using a transport layer protocol such as versions of WinSock including WinSock Version 1.1 as described in Windows Sockets Version 1.1 by Martin Hall, Mark Towfiq, Geoff Arnold, David Treadwell and Henry Sanders, published Jan. 20, 1993.

To service inputs from the keyboard 8, the lower level keyboard driver 21 responds to hardware interrupts generated by the keyboard 8. The lower level keyboard driver 21 receives scan codes from the keyboard 8 and initiates an IRP directed to the operating system kernel under the control of the I/O manager 19. A raw input thread process 25 at the operating system kernel translates the scan codes into virtual-key codes to be received at the API.

When processing the scan codes, the raw input thread process 25 may receive IRPs with scan codes for keystroke combinations such as "ctrl+alt+del" and, rather than transmit a corresponding virtual-key code to the API, the raw input thread process 25 passes the scan codes to lower level system processes executing independently of any application program. The lower level system processes then initiate action such as, for example, displaying a shutdown dialog box in response to the keystroke combination "ctrl+alt+del," displaying a menu in response to the keystroke combination "ctrl+esc," or activating a different window for receiving inputs in response to the keystroke combination "alt+tab."

Among the applications programs supported by the API of the operating system 20 is a remote control application 24 which transmits messages to the client terminal 6 for emulating keystroke inputs of the keyboard 10 of the client terminal 6 via the aforementioned transport layer protocol. According to an embodiment, the remote control application 24 receives inputs through the API of the operating system 20 in response to keystroke inputs detected by the keyboard drivers 21 and 23. The remote control application 24 initiates the transmission of data packets to the operating system 26 of the client terminal 6 including data representative of a queue of keystrokes based upon the received scan codes. The operating system 26 may then process the received data packets to emulate keystroke inputs at the keyboard 10.

According to an embodiment, the operating system 26 parses the data packets received at the transport layer to extract scan codes. The operating system 26 then transmits messages to the keyboard port of the keyboard 10 which are representative of the extracted scan codes. In a Windows '95 environment, this may be accomplished through use of a virtual driver. In a Windows NT 4.0 environment, this may be accomplished through a call to a specialized keyboard port driver.

According to an embodiment, when the remote control application 24 is launched on the operating system 20 of the remote terminal 4, a corresponding keyboard filter driver 22 is launched. The keyboard filter driver 22 affects the behavior of the keyboard class driver 23. While the keyboard filter driver 22 is active, the operating system 20 responds differently to keystroke inputs including keystroke combinations such as "ctrl+alt+del," "alt+tab," and "ctrl+esc". That is, rather than transmit an IRP to the raw input thread process 25 representative of detected keystrokes, the keyboard class driver 23 provides an IRP with dummy scan codes, such as all zeros, and transmits a message to the remote control application 24 independently of the raw input thread process 25 indicating receipt of the detected keystrokes. The raw input thread process, upon receiving the IRP with dummy scan codes, does not respond. The keyboard filter driver 22, therefore, inhibits the operating system kernel from responding to certain special keystroke combinations independently of an application program. In response to the message from the filter driver 22, the remote control application 24 transmits a message back down to the operating system 20 to initiate inclusion of the detected keystrokes in the queue of scan codes of the data packet transmitted to the operating system 26 through the transport layer.

In a Windows 95 environment, the keyboard filter driver 22 may be implemented in a VKD_filter_keyboard_input module which hooks in with the keyboard class driver 23. In a Windows NT 4.0 environment, the keyboard filter driver 22 may be implemented in an IRP completion routine of the keyboard class driver 23. As known to those skilled in the art of programming in the Windows NT 4.0 environment, an I/O completion routine in the keyboard class driver 23 enables the keyboard class driver to regain control of an IRP following processing at the lower level keyboard device driver 21. The I/O completion routine replaces the scan codes in the IRP from the lower level keyboard device driver 21 with the dummy scan codes, and notifies the remote control application 24 of a receipt of the scan codes. Therefore, the keyboard filter driver 22 inhibits the operating system kernel from responding to keystroke inputs independently of an application program. Additionally, the keyboard filter driver 22 in conjunction with the remote control application 24 causes these keystroke inputs to be transmitted to the client terminal 6 as an emulation of keystrokes at the keyboard 10.

Figure 3:
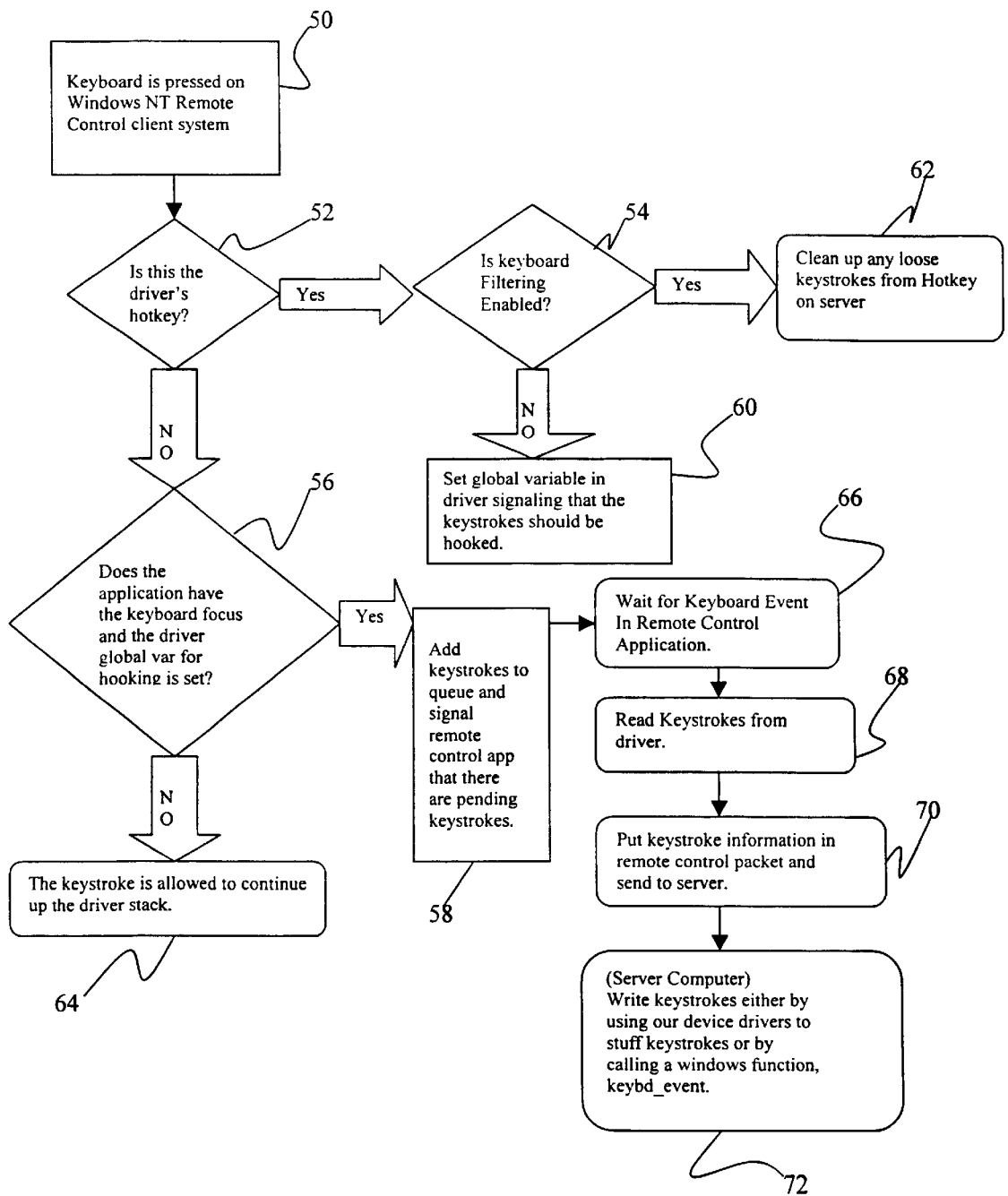
FIG. 3 illustrates processes for transmitting data from the remote terminal to the client terminal to emulate keystrokes at the client terminal.

FIG. 3 illustrates the interaction between the remote control application 24 and the processes at the keyboard driver of the operating system 20 as modified by the keyboard filter driver 22. Step 50 represents a depression of a key on the keyboard 8 of the remote terminal 4. In the illustrated embodiment, the operating system 20 includes a debugging feature which is activated by the detection of one or more "hot keys" at the keyboard driver. Step 52 determines whether the depressed keystroke is a hotkey to initiate a debugging mode. If the keystroke is a hotkey, step 54 determines whether the keyboard filter driver 22 is active. If the keyboard filter driver 22 is active, step 62 cleans up any loose keystrokes which may have been transmitted from the remote control application 24 to the operating system 26 of the client terminal 6. Such loose keystrokes may include, for example, the depression of the "ctrl" key which has not been followed by a signal indicating a release of the same. In this example, step 62 would initiate the transmission of data to emulate a release of the "ctrl" key at the keyboard 10 of the client terminal 6. If step 54 determines that the keyboard filter driver 22 is not enabled, step 60 initiates a sequence of events to have subsequent keystrokes intercepted or "hooked" for transmission to the client terminal 6 by transmitting the detected hotkey up the software stack of the remote terminal 4, launching the keyboard filter driver 22 and resuming the transmission of messages to the operating system 26 to emulate keystrokes at the keyboard 10.

If the keystroke received at step 50 is not one of the keyboard driver's hotkeys, step 56 determines whether the remote control application 24 has keyboard focus and whether the driver global variable for hooking is set. If so, step 58 adds the keystroke to a queue of keystrokes to be transmitted to the remote control application 24, and signals to the remote control application 24 that there are pending keystrokes. Following a wait period at step 66, the remote control application 24 reads the keystrokes from a driver memory location at step 68, and encodes the keystroke information in a data packet to be transmitted to the client terminal 6 at step 70. Step 72 indicates receipt of the data packet at the client terminal 6 which emulates the keystroke at keyboard 10 corresponding to the keystroke event at step 50.

If step 56 determines that the remote control application 24 does not have the keyboard focus, keystrokes scan codes are processed by the raw input thread process in the normal fashion and transmitted up the operating system stack to the API as indicated by step 64.

Embodiments described herein relate to a method of intercepting keystroke inputs directed to an operating system kernel of a remote terminal when using a remote control application on the remote terminal for emulating keystroke inputs at a client terminal. A filter driver at the remote terminal causes intercepted keyboard scan codes to be transmitted to the client terminal to emulate keystrokes at the client terminal. Accordingly, a specific keystroke combination such as "ctrl+alt+del" at the remote terminal is transmitted to the client terminal without any awkward menus or tool bar buttons.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer network comprising:
    a client terminal;
    a remote terminal including an operating system having an operating system kernal for responding to detection of keystrokes independently of any application program executing on the remote terminal;
    first logic at the remote terminal for launching an application program for initiating the transmission of data to the client terminal to emulate keystroke inputs at the client terminal in response to detection of keystrokes at the remote terminal; and
    second logic at the remote terminal, enabled when the application program for initiating the transmission of data to the client terminal is launched, for inhibiting the operating system kernel from responding to the detection of keystrokes independently of an application executing at the remote terminal, wherein the second logic is implemented via a filter driver, and the filter driver is separate from the operating system kernal.

2. The computer network of claim 1, wherein the operating system kernel is responsive to detection of any one of a set of predetermined keystroke combinations independently of any application program, and the computer network further includes third logic at the remote terminal for transmitting a message to processes executing at the client terminal to emulate detection of the predetermined combinations of keystroke inputs at the client terminal.

3. The computer network of claim 1 wherein the operating system kernel is responsive to input/output request packets and the operating system further includes a keyboard device driver for receiving keystroke inputs, the keyboard device driver providing data representative of keyboard scan codes for input/output request packets directed to the operating system kernel, and wherein the second logic includes fourth logic for transmitting an input/output request packet representative of dummy keyboard scan codes.

4. The computer network of claim 2, wherein the set of predetermined keystroke combinations of keystrokes includes at least one of "ctrl+alt+del," "alt+tab" and "ctrl+esc."

5. A computer readable medium, the computer readable medium including computer readable instructions encoded thereon for: launching an application program at a remote terminal for initiating transmission of data to processes executing at a client terminal to emulate keystroke inputs at the client terminal in response to detection of keystrokes at the remote terminal; and inhibiting, via a filter driver, an operating system kernel at the remote terminal from responding to detection of keystrokes at the remote terminal independently of an application executing at the remote terminal when the application for initiating the transmission of data to the client terminal is enabled, wherein the filter driver is separate from the operating system kernal.

6. The computer readable medium of claim 5, wherein the operating system kernel is responsive to detection of any one of a set of predetermined combinations of keystrokes independently of any application program, and wherein the computer readable medium further includes computer readable instructions encoded thereon for initiating a transmission of a message to the processes executing at the client terminal to emulate detections of the predetermined combinations of keystroke inputs at the client terminal.

7. The computer readable medium of claim 5, wherein the operating system kernel is responsive to input/output request packets and a keyboard device driver at the remote terminal receives keystroke inputs, the keyboard device driver providing data representative of keyboard scan codes for input/output request packets directed to the operating system kernel, and wherein the computer readable medium further includes computer readable instructions encoded thereon for transmitting an input/output request packet representative of dummy keyboard scan codes in response to detection of keystroke inputs.

8. The computer readable medium of claim 6, wherein the predetermined combinations of keystrokes include at least one of "ctrl+alt+del," "alt+tab" and "ctrl+esc."

9. A remote terminal comprising:
  a processor for executing processes including an operating system, the operating system including an operating system kernel having logic for responding to detection of any one combination of keystrokes of a set of predetermined combinations of keystrokes independently of any application program executing on a remote terminal;
  first logic for launching an application for initiating the transmission of data to a client terminal to emulate keystrokes at the client terminal in response to detection of keystrokes at the remote terminal; and
  second logic for inhibiting the operating system kernel from responding to the detection of keystrokes independently of an application executing at the remote terminal while the application for initiating the transmission of data to the client terminal is launched, wherein the second logic is implemented via a filter driver, and the filter driver is separate from the operating system kernal.

10. The remote terminal of claim 9, wherein the operating system kernel is responsive to detection of any one of a set of predetermined combinations of keystrokes independently of any application program, and the remote terminal further includes logic for transmitting a message to the processes executing at the client terminal to emulate detection of the predetermined combinations of keystroke inputs at the client terminal.

11. The remote terminal of claim 9, wherein the operating system kernel is responsive to input/output request packets and the operating system further includes a keyboard device driver for receiving keystroke inputs, the keyboard device driver providing data representative of keyboard scan codes for input/output request packets directed to the operating system kernel, and wherein the second logic includes fourth logic for transmitting an input/output request packet representative of dummy keyboard scan codes.

12. The remote terminal of claim 10, wherein the set of predetermined combinations of keystrokes includes at least one of "ctrl+alt+del," "alt+tab" and "ctrl+esc."

13. A method of transmitting data from a remote terminal to a client terminal comprising:
  executing an operating system at a remote terminal, the operating system having an operating system kernel for responding to detection of keystrokes independently of any application executing on the remote terminal;
  launching an application at the remote terminal for initiating the transmission of data to the client terminal for emulating keystrokes to the processes executing thereon; and
  while the application for initiating the transmission of data to the client terminal is launched, inhibiting, via a filter driver, the operating system kernel from responding to the detection of keystrokes independent of an application executing at the remote terminal, wherein the filter driver is separate from the operating system kernal.

14. The method of claim 13, wherein the operating system kernel is responsive to detections of any one of a set of predetermined combinations of keystrokes independently of any application, the method further including transmitting a message to the processes executing at the client terminal to emulate detection of the predetermined combinations of keystroke inputs at the client terminal.

15. The method of claim 13, wherein the operating system kernel is responsive to input/output request packets and the operating system further includes a keyboard device driver for receiving keystroke inputs, the keyboard device driver providing data representative of keyboard scan codes for input/output request packets directed to the operating system kernel, and wherein the method further includes transmitting an input/output request packet representative of dummy keyboard scan code.

16. The method of claim 14, wherein the set of predetermined combinations of keystroke inputs includes at least one of "ctrl+alt+del," "alt+tab" and "ctrl+esc" independently of an application executing at the remote terminal.

17. A computer readable medium including computer readable instructions encoded thereon for:
  receiving keyboard scan codes in response to keystroke events detected at a keyboard of a remote terminal;
  queuing the received scan codes for transmission from the remote terminal to a client terminal if an instance of a remote control application executing on the remote terminal has keyboard focus; and
  transmitting the received scan codes to a raw input thread process of an operating system executing on the remote terminal if the instance of the remote control application does not have keyboard focus.

18. The computer readable medium of claim 17, the computer readable medium further including computer readable instructions encoded thereon for inhibiting the transmission of the received scan codes to the raw input thread process if the instance of the remote control application has keyboard focus.

19. The computer readable medium of claim 17, the computer readable medium further including computer readable instructions encoded thereon for performing the following if the instance of the remote control application has keyboard focus:
  retrieving the received scan codes from a keyboard driver memory location; and
  encoding data representative of the retrieved scan codes in a data packet for transmission to a client terminal.

20. The computer readable medium of claim 17, the computer readable medium further including computer readable instructions encoded thereon for:
  determining whether a keyboard filter process is enabled if a received scan code is of a hotkey associated with a keyboard driver; and
  if the keyboard filter process is enabled, transmitting a message to a client terminal to deselect a keystroke as part of the hotkey which was transmitted to the client terminal.

* * * * *